July 30, 1946.  A. R. VAN C. WARRINGTON  2,405,080
RELAY PROTECTIVE ARRANGEMENT
Filed Oct. 6, 1944

Inventor:
Albert R. van C. Warrington,
by Harry E. Dunham
His Attorney.

Patented July 30, 1946

2,405,080

UNITED STATES PATENT OFFICE 2,405,080

RELAY PROTECTIVE ARRANGEMENT

Albert R. van C. Warrington, Wallingford, Pa., assignor to General Electric Company, a corporation of New York Application October 6, 1944, Serial No. 557,428

16 Claims. (Cl. 175—294)

1

My invention relates to relay protective arrangements and particularly to such relay arrangements for use on alternating current circuits having a series connected capacitor.

In order to increase the amount of load that can be transmitted over a transmission line, a capacitor is sometimes connected in series therewith. Such a series connected capacitor, however, changes the impedance of the line in such a manner that a fault on the circuit at a point between the supply end of the circuit and the capacitor may cause less fault current to flow than when the fault occurs at a point on the far side of the capacitor so that the latter fault appears to a distance relay as being nearer to the relay than the first mentioned fault. Therefore, distance relay arrangements of the type used heretofore are not applicable to such an alternating current circuit having a series connected capacitor because of the change in the line impedance effected by the capacitor.

One object of my invention is to provide a distance relay arrangement for an alternating current circuit having a series connected capacitor which distinguishes between faults occurring on opposite sides of the point where the capacitor is connected in the circuit.

Another object of my invention is to provide an improved distance relay arrangement for an alternating current circuit having a series connected capacitor which gives instantaneous protection for the entire circuit between the points where the relay and capacitor are respectively connected to the circuit.

My invention will be better understood from the following description when taken in connection with the accompanying drawing, and its scope will be pointed out in the appended claims.

Figure 1:
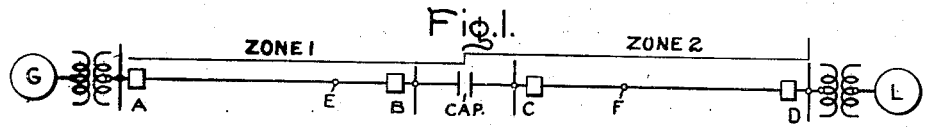
Figure 2:
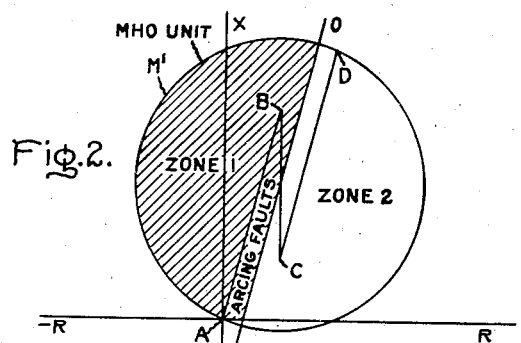
Figure 3:
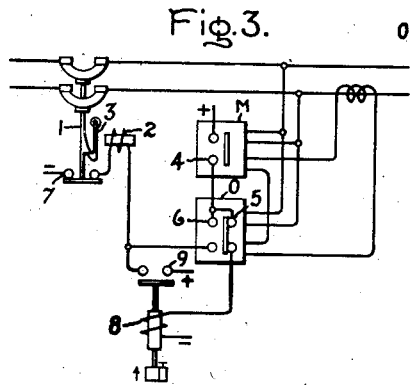
Figure 4:
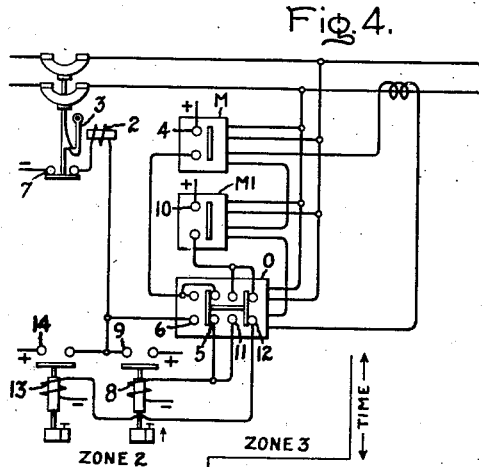
Figure 5:
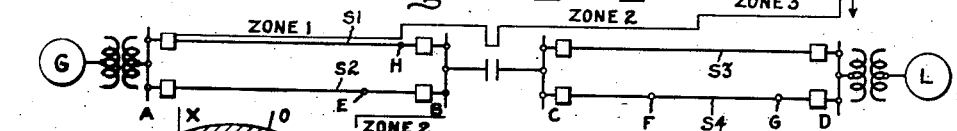
Figure 6:
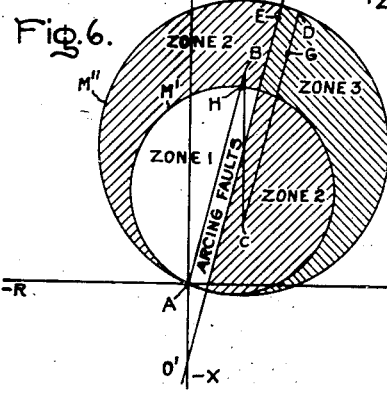

In the accompanying drawing, Fig. 1 is a single line diagram of an electric circuit to which my improved relay arrangement may be connected; Fig. 2 is an explanatory vector diagram; Fig. 3 is a circuit breaker control arrangement embodying my improved relay arrangement; Fig. 4 is a modification of the embodiment of my invention shown in Fig. 3; Fig. 5 is an explanatory single line diagram of an electric circuit; and Fig. 6 is an explanatory vector diagram.

When a capacitor is connected in series in an alternating current circuit, as shown in the single line diagram in Fig. 1, the fault impedance characteristic of the circuit comprises, as shown in Fig. 2, a portion AB representing the impedance of the circuit from the point A to the point B in Fig. 1, a portion BC representing the reactance

2 of the capacitor CAP and a portion CD representing the impedance of the circuit from the point C to the point D. From Fig. 2, it is evident that overcurrent or distance relays of the prior art when connected at the point A in Fig. 1 are not applicable as fault responsive relays because the fault current, impedance and reactance measured by such relays are not a reliable indication of the location of the fault. For example, the impedance between the point A and a fault at the point F in Fig. 1 is less than the impedance between the point A and a fault at the point E, and therefore the fault at point E would appear to be nearer to a distance relay of the impedance or reactance type located at point A than a fault at point E.

In order to distinguish between a fault that occurs between the points A and B of the circuit shown in Fig. 1 and a fault that occurs between the points C and D, I provide, in accordance with my invention, a distance relay having such an impedance characteristic that on a resistance-reactance polar diagram for the circuit the impedance characteristic of the distance relay crosses the portion BC of the fault impedance characteristic of the circuit so that the portion AB of the fault impedance characteristic is on one side of the relay impedance characteristic and the portion CD of the fault impedance characteristic is on the other side of the relay impedance characteristic. As shown in Fig. 2, the straight line OO' represents the impedance characteristic of a well-known type of ohm relay which is so located that it bisects the portion BC of the fault impedance characteristic of the circuit and is substantially parallel to the other two portions AB and CD. With such a relay characteristic, it is evident that a fault anywhere between the point A and capacitor CAP, indicated as zone 1 in Fig. 1 effects the operation of the ohm relay, but a fault between the points C and D, indicated as zone 2, does not effect the operation of the ohm relay.

In order to prevent the ohm relay from effecting a desired control operation when it is operated by a fault which occurs to the left of the point A and to the right of point D in Fig. 1, other suitable fault responsive means such as a distance relay having an impedance characteristic M' in Fig. 2 may be used so that the desired control operation can be effected only when the impedance vector of the fault falls to the left of the impedance characteristic OO' and also within the impedance characteristic M'. It will be obvious to those skilled in the art that the circle M' shown in Fig. 2 is the impedance characteristic of a mho type of distance relay connected to the circuit at point A and having a reach extending to the point D in Fig. 1.

In Fig. 3, I have shown a relay arrangement embodying my invention for controlling a circuit interrupter which may be connected in the circuit at the point A in Fig. 1. In this Fig. 3, 1 represents a circuit interrupter of the latched closed type having a trip coil 2 which, when energized, releases a latch 3 to effect the opening of the circuit interrupter 1. The energization of the trip coil 2 is controlled by a voltage restrained directional relay M of the type now well known in the art as a mho relay. This relay M is connected in a manner well known in the art to the circuit at the point where the circuit interrupter 1 is located so that in Fig. 1 the reach of the relay would extend from the point A to the point D and would have the impedance characteristic M' shown in Fig. 2. Since the construction of such a mho relay M is well known in the art and constitutes no part of my present invention, I have represented this relay by a rectangle containing a set of contacts 4 in order to simplify the disclosure.

The energization of the trip coil 2 is also controlled by an ohm relay O of the well-known reactance-at-an-angle type, which is connected in a manner well known in the art to the circuit so that when used at point A in Fig. 1 the relay would have the impedance characteristic OO' shown in Fig. 2. Since the construction of such an ohm relay is well known in the art and constitutes no part of my present invention I have represented this relay by a rectangle containing the contacts 5 and 6.

Under normal operating conditions, the contacts 5 of the relay O are closed and the contacts 6 are open, but when a fault occurs between the points A and B in Fig. 1, the relay O operates to close its contacts 6 and open its contacts 5. The contacts 4 of the relay M and the contacts 6 of the ohm relay O are connected in series in an energizing circuit for the trip coil 2 through the auxiliary contacts 7 on the circuit interrupter 1 so that whenever a fault occurs between the points A and B, the energizing circuit for the trip coil 2 is immediately completed to effect the opening of the circuit interrupter 1. The contacts 4 of the relay M and the contacts 5 of the ohm relay O are connected in series in an energizing circuit for a time relay 8, which in turn by closing its contacts 9 completes an energizing circuit for the trip coil 2. Therefore, when a fault occurs between the points C and D in Fig. 1 so that the relay M is operated but the relay O is not operated, the time relay 8 is energized and after being energized for a predetermined time interval closes its contacts 9 to complete the energizing circuit of the trip coil 2 so as to effect the opening of the circuit interrupter 1.

It will be observed that the improved relay arrangement shown in Fig. 3 instantaneous protection is obtained whenever a fault occurs anywhere on the protected line section AB of the electric circuit shown in Fig. 1.

While I have shown only one mho relay M and one ohm relay in a single phase circuit in order to simplify the disclosure, it will be obvious to those skilled in the art that when my improved relay arrangement is used in connection with a polyphase circuit, a similar set of relays will be provided for each phase of the circuit.

In Fig. 4, I have shown a modification of the control arrangement shown in Fig. 3 which is particularly adapted for use in controlling a circuit interrupter in one of a plurality of parallel connected circuits, which in turn are connected in a series circuit containing a series capacitor. Such a series circuit is shown in Fig. 5 in which the points A and B of the series circuit are interconnected by two parallel line sections S1 and S2, the points B and C are connected together by a series connected capacitor CAP, and the points C and D are interconnected by two parallel line sections S3 and S4.

When my improved relay arrangement is used to control the circuit interrupter at point A in the line section S1, it is necessary to design the mho relay M so that its zone 1 reach is less than the distance between the points A and B in order to prevent the mho relay from being operated by a fault on the parallel line section S2 near the point B. Furthermore, it is evident from the resistance-reactance polar diagram shown in Fig. 6 that when the reach of the mho relay M is decreased in this manner to a point such as H on the line section S1, no protection is provided for faults on the line section S1 between the points E and B nor for faults on the line sections S3 and S4 near the remote point D. Therefore, in order to provide suitable protection against such faults, I employ another mho relay M1, which is connected to the series circuit at the same point the mho relay M is connected and which has an impedance characteristic M'' which is the same as the impedance characteristic M' of the mho relay M in Fig. 3, namely a reach extending from the point A to the point D in Fig. 5. The mho relay M1 has contacts 10 which are closed in response to a fault which occurs within the reach of the relay and which are connected in series with the contacts 11 of the ohm relay O so as to complete an energizing circuit for the time relay 8 when both the mho relay M1 and the distance relay O are operated by a fault. The contacts 10 of the mho relay M1 are also connected in series with the contacts 12 of the ohm relay O so as to complete an energizing circuit for a time relay 13 when the mho relay M1 is operated by a fault but the ohm relay O is not. The time relay 13 has a longer time delay than the time relay 8, and, when it closes its contacts 14, it completes an energizing circuit for the trip coil 2 of the circuit interrupter 1.

The operation of the control arrangement shown in Fig. 4 will be obvious from the above description and the vector diagram shown in Fig. 6. When a fault occurs on the line section S1 in zone 1 of Fig. 5, namely between the points A and H, the mho relay M and the ohm relay O are both operated so that an energizing circuit is immediately completed for the trip coil 2 through the contacts 4 of the mho relay M and the contacts 6 of the ohm relay O to effect the opening of the circuit interrupter 1.

When a fault occurs between the points C and D at a point within the reach of the mho relay M, namely within zone 2, an energizing circuit is completed for the time relay 8 through the contacts 4 of the mho relay M and the contacts 5 of the ohm relay O. After a predetermined time interval, the time relay 8 closes its contacts 9 and completes an energizing circuit for the trip coil 2 of the circuit interrupter 1.

When a fault occurs on the line section S2 at a point which is beyond the reach of the mho relay M but within the reach of the mho relay M1, namely within zone 2, another circuit is completed for the time relay 8 through the contacts 10 of the mho relay M1 and the contacts 11 of the distance relay 0.

When a fault occurs on either the line section S3 or S4 at a point within the reach of the mho relay M1 but beyond the reach of the mho relay M, namely within zone 3, the circuit of the time relay 13 is completed through the contacts 10 of the mho relay M1 and the contacts 12 of the ohm relay 0, and if the fault is not cleared before the time relay 13 completes its timing operation, an energizing circuit is completed for the trip coil 2 when the relay 13 closes its contacts 14.

Therefore, it will be seen that the arrangement shown in Fig. 4 provides three different time zones, namely an instantaneous time zone for faults which effect the operation of both the mho relay M and the ohm relay 0, a second time zone for faults which effect the operation of the mho relay M but do not effect the operation of the ohm relay 0 and for faults which effect the operation of the mho relay M1 and the ohm relay 0 but not the operation of the mho relay M, and a third zone for faults which effect only the operation of the mho relay M1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. A relay protective arrangement for an alternating current circuit having a series connected capacitor comprising an ohm relay connected to said circuit and having on a resistance-reactance polar diagram for said circuit an impedance characteristic which crosses the portion of the fault impedance characteristic of said circuit representing the impedance of said capacitor and which does not cross the portion of said fault impedance characteristic representing the impedance of the portion of said circuit between the points where said relay and capacitor are connected.

2. A relay protective arrangement for an alternating current circuit having a series connected capacitor comprising an ohm relay connected to said circuit and having on a resistance-reactance polar diagram for said circuit an impedance characteristic which crosses the portion of the fault impedance characteristic of said circuit representing the impedance of said capacitor and which is substantially parallel to the portion of said fault impedance characteristic representing the impedance of the portion of said circuit between the points where said relay and said capacitor are respectively connected.

3. A relay protective arrangement for an alternating current circuit having a series connected capacitor comprising a distance relay responsive to faults on said circuit between the point where said relay is connected to said circuit and a point on said circuit nearer said capacitor, and an ohm relay having on a resistance-reactance polar diagram for said circuit an impedance characteristic which crosses the portion of the fault impedance characteristic of said circuit representing the impedance of said capacitor.

4. A relay protective arrangement for an alternating current circuit having a series connected capacitor comprising a distance relay responsive to faults on said circuit between the point where said relay is connected to said circuit and a point on said circuit nearer said capacitor, and an ohm relay having on a resistance-reactance polar diagram for said circuit an impedance characteristic which crosses the portion of the fault impedance characteristic of said circuit representing the impedance of said capacitor and which is located on one side of the portion of said fault impedance characteristic representing the impedance of the portion of said circuit between said points.

5. A relay protective arrangement for an alternating current circuit having a series connected capacitor comprising a distance relay responsive to faults on said circuit between the point where said relay is connected to said circuit and a point on said circuit nearer said capacitor, and an ohm relay having on a resistance-reactance polar diagram for said circuit an impedance characteristic which crosses the portion of the fault impedance characteristic of said circuit representing the impedance of said capacitor and which is substantially parallel to the portion of said fault impedance characteristic representing the impedance of the portion of said circuit between said points.

6. A relay protective arrangement for an alternating current circuit having a series connected capacitor comprising a distance relay responsive to faults on said circuit between the point where said relay is connected to said circuit and a predetermined point on said circuit beyond said capacitor, and an ohm relay having on a resistance-reactance polar diagram for said circuit an impedance characteristic which crosses the portion of the fault impedance characteristic of said circuit representing the impedance of said capacitor.

7. An arrangement for effecting the opening of a circuit interrupter in an alternating current circuit having a series connected capacitor comprising a distance relay responsive to faults on said circuit between said interrupter and a predetermined point on said circuit beyond said capacitor, an ohm relay having on a resistance-reactance polar diagram for said circuit an impedance characteristic which crosses the portion of the fault impedance characteristic of said circuit within the operating range of said distance relay only at a point within the portion representing the impedance of said capacitor, means controlled by said relays for effecting an immediate opening of said circuit interrupter when both of said relays are operated in response to a fault on said circuit, and means controlled by said relays for effecting a time delayed opening of said circuit interrupter when only said distance relay is operated in response to a fault on said circuit.

8. An arrangement for effecting the opening of a circuit interrupter in an alternating current circuit having a series connected capacitor comprising a distance relay responsive to faults on said circuit between said interrupter and a point on said circuit nearer said capacitor, an ohm relay having on a resistance-reactance polar diagram for said circuit an impedance characteristic which crosses the portion of the fault impedance characteristic of said circuit within the operating range of said distance relay only at a point within the portion representing the impedance of said capacitor, a timing device for effecting the opening of said interrupter, contacts controlled by said relays and arranged to effect the opening of said interrupter independently of said timing device when both of said relays are operated in response to a fault on said circuit, and contacts controlled by said relays and arranged to effect the operation of said timing device when only said distance relay is operated in response to a fault on said circuit.

9. A relay protective arrangement for an alternating current circuit having a series connected capacitor comprising a mho relay having a predetermined reach along said circuit in the direction of said capacitor and an ohm relay having on a resistance-reactance polar diagram for said circuit an impedance characteristic which is located on one side of the portion of the fault impedance characteristic of said circuit representing the impedance of said circuit between the points thereof where said relays and capacitor are connected and which crosses the portion thereof representing the impedance of said capacitor.

10. A relay protective arrangement for an alternating current circuit having a series connected capacitor comprising a mho relay having a reach including all of the portion of said circuit between the points where said relay and said capacitor are connected, and an ohm relay having on a resistance-reactance polar diagram for said circuit an impedance characteristic which is located on one side of the portion of the fault impedance characteristic of said circuit representing the impedance between said points and which crosses the portion thereof representing the impedance of said capacitor.

11. A relay protective arrangement for an alternating current circuit having a series connected capacitor comprising a mho relay having a reach extending from the point where said relay is connected to said circuit to a predetermined point beyond said capacitor and an ohm relay having on a resistance-reactance polar diagram for said circuit an impedance characteristic which is located on one side of the portion of the fault impedance characteristic of said circuit representing the impedance between said capacitor and the point where the distance relay is connected and which crosses the portion thereof representing the impedance of said capacitor.

12. An arrangement for effecting the opening of a circuit interrupter in an alternating current circuit having a series connected capacitor comprising a mho relay having from a predetermined point on said circuit a predetermined reach along said circuit in the direction of said capacitor, a second mho relay having from said point a longer reach along said circuit in the direction of said capacitor than said first mentioned mho relay, an ohm relay having on a resistance-reactance polar diagram for said circuit an impedance characteristic which is located on one side of the portion of the fault impedance characteristic of said circuit representing the impedance between said point and said capacitor and which crosses the portion thereof representing the impedance of said capacitor, and means controlled by said relays for effecting an immediate opening of said circuit interrupter when said first mentioned mho relay and said ohm relay are both operated in response to a fault on said circuit and an opening of said circuit interrupter after a predetermined time delay when said first mentioned mho relay is operated but said ohm relay is not operated in response to a fault on said circuit and an opening of said circuit interrupter after a predetermined time delay which is longer than said first mentioned time delay when said second mho relay is operated but said first mentioned mho and ohm relays are not operated in response to a fault on said circuit.

13. An arrangement for effecting the opening of a circuit interrupter in an alternating current circuit having a series connected capacitor comprising a mho relay having from a predetermined point on said circuit a predetermined reach along said circuit in the direction of said capacitor, a second mho relay having a longer reach along said circuit from said point in the direction of said capacitor than said first mentioned mho relay, an ohm relay having on a resistance-reactance polar diagram for said circuit an impedance characteristic which is located on one side of the portion of the fault impedance characteristic of said circuit representing the impedance between said point and said capacitor and which crosses the portion thereof representing the impedance of said capacitor, and means controlled by said relays for effecting an immediate opening of said circuit interrupter when said first mentioned mho relay and said ohm relay are both operated in response to a fault on said circuit and an opening of said circuit interrupter after a predetermined time delay when said first mentioned mho relay is operated but said ohm relay is not operated in response to a fault on said circuit and also when said second mho relay and said ohm relay are both operated but said first mentioned mho relay is not operated in response to a fault on said circuit and an opening of said circuit interrupter after a predetermined time delay which is longer than said first mentioned time delay when said second mho relay is operated but said first mentioned mho and ohm relays are not operated in response to a fault on said circuit.

14. An arrangement for effecting the opening of a circuit interrupter at one end of one of a plurality of parallel connecting alternating current circuits which in turn are connected in a series circuit containing a series capacitor, comprising a distance relay having a predetermined reach along said series circuit from said circuit interrupter in the direction of said capacitor, a second distance relay having a longer reach along said series circuit from said circuit interrupter in said direction than said first mentioned distance relay, an ohm relay having on a resistance-reactance polar diagram for said series circuit an impedance characteristic which is located on one side of the portion of the fault impedance characteristic of said series circuit representing the impedance between said circuit interrupter and said capacitor and which crosses the portion thereof representing the impedance of said capacitor, and means controlled by said relays for effecting an immediate opening of said circuit interrupter when said first mentioned distance and said ohm relays are both operated in response to a fault on said series circuit and an opening of said circuit interrupter after a predetermined time delay when said first mentioned distance relay is operated but said ohm relay is not operated in response to a fault on said series circuit and also when said second distance and said ohm relays are both operated but said first mentioned distance relay is not operated in response to a fault on said series circuit.

15. An arrangement for effecting the opening of a circuit interrupter at one end of one of a plurality of parallel connected alternating current circuits which in turn are connected in a series circuit containing a series capacitor, comprising a distance relay having a predetermined reach along said series circuit from said circuit interrupter in the direction of said capacitor, a second distance relay having a longer reach along said series circuit from said circuit interrupter in said direction than said first mentioned distance relay, an ohm relay having on a resistance-reactance polar diagram for said series circuit an impedance characteristic which is located on one side of the portion of the fault impedance characteristic of said series circuit representing the impedance between said circuit interrupter and said capacitor and which crosses the portion thereof representing the impedance of said capacitor, and means controlled by said relays for effecting an immediate opening of said circuit interrupter when said first mentioned distance and said ohm relays are both operated in response to a fault on said series circuit and an opening of said circuit interrupter after a predetermined time delay when said first mentioned distance relay is operated but said ohm relay is not operated in response to a fault on said series circuit and also when said second distance and said ohm relays are both operated but said first mentioned distance relay is not operated in response to a fault on said series circuit and an opening of said circuit interrupter after a predetermined time delay which is longer than said first mentioned time delay when only said second mentioned distance relay is operated in response to a fault on said series circuit.

16. An arrangement for effecting the opening of a circuit interrupter in an alternating current circuit having a series connected capacitor comprising a distance relay having from a predetermined point on said circuit a predetermined reach along said circuit in the direction of said capacitor, a second distance relay having from said point a longer reach along said circuit in said direction than said first mentioned distance relay, an ohm relay having on a resistance-reactance polar diagram for said circuit an impedance characteristic which is located on one side of the portion of the fault impedance characteristic of said circuit representing the impedance between said point and said capacitor and which crosses the portion thereof representing the impedance of said capacitor, and means controlled by said relays for effecting an immediate opening of said circuit interrupter when said first mentioned distance and said ohm relays are both operated in response to a fault on said circuit and an opening of said circuit interrupter after a predetermined time delay when said first mentioned distance relay is operated but said ohm relay is not operated in response to a fault on said circuit and an opening of said circuit interrupter after a predetermined time delay which is longer than said first mentioned time delay when only said second mentioned distance relay is operated in response to a fault on said circuit.

ALBERT R. van C. WARRINGTON.